US012779631B2

(12) United States Patent
Chiang

(10) Patent No.: US 12,779,631 B2
(45) Date of Patent: Nov. 3, 2026

(54) RATCHET WRENCH

(71) Applicant: William Tools Co., Ltd., Taichung City (TW)

(72) Inventor: Shui-Lai Chiang, Taichung City (TW)

(73) Assignee: William Tools Co., Ltd., Taichung City (TW)

( * ) Notice: Subject to any disclaimer, the term of this patent is extended or adjusted under 35 U.S.C. 154(b) by 257 days.

(21) Appl. No.: 18/884,422

(22) Filed: Sep. 13, 2024

(65) Prior Publication Data

US 2025/0128385 A1 Apr. 24, 2025

(30) Foreign Application Priority Data

Oct. 18, 2023 (TW) ................................ 112139797

(51) Int. Cl.
*B25B 13/46* (2006.01)
*B25B 13/48* (2006.01)

(52) U.S. Cl.
CPC .......... *B25B 13/467* (2013.01); *B25B 13/465* (2013.01); *B25B 13/481* (2013.01)

(58) Field of Classification Search
CPC ......... B25B 13/02; B25B 13/04; B25B 13/06; B25B 13/46; B25B 13/463; B25B 13/465; B25B 13/467; B25B 13/48; B25B 13/481; B25B 17/00; B25B 23/0007; B25B 23/0035; B25B 23/141; B25B 23/142; B25B 23/16; B25B 21/002; B25B 21/004
See application file for complete search history.

(56) References Cited

U.S. PATENT DOCUMENTS

| | | | | | |
|---|---|---|---|---|---|
| 5,058,463 | A * | 10/1991 | Wannop | B25B 13/467 | 81/62 |
| 7,181,996 | B1 * | 2/2007 | Chu | B25B 13/465 | 81/57.29 |
| 7,267,033 | B1 * | 9/2007 | Lai | B25B 23/0035 | 81/62 |
| 10,525,572 | B2 * | 1/2020 | Hu | H02K 7/108 | |
| 2015/0314426 | A1 * | 11/2015 | Chiang | B25B 13/481 | 81/58.1 |

* cited by examiner

*Primary Examiner* — Robert J Scruggs
(74) *Attorney, Agent, or Firm* — MUNCY, GEISSLER, OLDS & LOWE, P.C.

(57) ABSTRACT

A ratchet wrench is provided, including: a main body, including a receiving hole, the receiving hole having a first annular inner teeth portion; a driving shaft, having a first annular outer teeth portion; a rotation seat, received in the receiving hole; at least one ring gear, each ring gear having an annular teeth portion and a second annular inner teeth portion, the annular teeth portion of the at least one ring gear engaged with the first annular outer teeth portion; and an engagement unit, disposed on the rotation seat, including a first pawl portion and at least one second pawl portion, a first teeth portion of the first pawl portion engaged with the first annular inner teeth portion, and a second teeth portion of the at least one second pawl portion engaged with the second annular inner teeth portion of the at least one ring gear.

8 Claims, 8 Drawing Sheets

RATCHET WRENCH

BACKGROUND OF THE INVENTION

Field of the Invention

The present invention relates to a wrench, and more particularly, to a ratchet wrench.

Description of the Prior Art

Generally, hand tools are used to fasten the fasteners during fastening operations, achieving a labor-saving effect. Moreover, to enhance practicality, there is a ratchet wrench on the market that has a ratcheting mechanism, which allows the drive head of the ratchet wrench to rotate freely.

However, the ratchet wrenches on the market can only fasten fasteners by repeatedly pressing and swinging the handle back and forth. Therefore, it is difficult to swing the handle of the ratchet wrench through a large range of motion in extremely tight spaces, making it challenging to fasten or loosen the fasteners.

In addition, the internal structure of the conventional ratchet wrenches is complex, making them difficult to assemble and leading to low assembly efficiency.

The present invention is, therefore, arisen to obviate or at least mitigate the above-mentioned disadvantages.

SUMMARY OF THE INVENTION

The main object of the present invention is to provide a ratchet wrench that is easy to assemble and can be operated in a narrow space.

To achieve the above and other objects, a ratchet wrench is provided, including: a main body, including a receiving hole and a shaft hole, the receiving hole having a first annular inner teeth portion; a driving shaft, disposed through the shaft hole, being rotatable about a first axial direction, having a first annular outer teeth portion; a rotation seat, having a connection portion, received in the receiving hole and being rotatable about a second axial direction, the first axial direction being transverse to the second axial direction; at least one ring gear, the at least one ring gear rotatably received in the receiving hole, the at least one ring gear having an annular teeth portion and a second annular inner teeth portion, the annular teeth portion of the at least one ring gear engaged with the first annular outer teeth portion; and an engagement unit, disposed on the rotation seat, including a first pawl portion, at least one second pawl portion, a first elastic member and at least one second elastic member, the first elastic member biasing a first teeth portion of the first pawl portion to engage with the first annular inner teeth portion, the at least one second elastic member biasing a second teeth portion of the at least one second pawl portion to engage with the second annular inner teeth portion of the at least one ring gear; wherein the ratchet wrench includes two said ring gears; the rotation seat has a notch formed on an outer circumference thereof, the notch includes an abutting portion, the engagement unit is received in the notch, the engagement unit includes two said second pawl portions and two said second elastic members, the first pawl portion rotates relative to the rotation seat with a first abutting end portion which abuts against the abutting portion as a first rotation center; each of the two second pawl portions rotate relative to the rotation seat with a second abutting end portion, which abuts against the abutting portion as a second rotation center, the first elastic member elastically abuts between the rotation seat and the first pawl portion, each of the two second elastic members elastically abuts between the rotation seat and one of the two second pawl portions; wherein the notch includes a radial opening that is radially open on the rotation seat, the radial opening is communicated with the notch, the radial opening opens toward the first annular inner teeth portion and the second annular inner teeth portion of the two ring gears, the first teeth portion of the first pawl portion passes through the radial opening to engage with the first annular inner teeth portion, the second teeth portion of each of the two second pawl portions respectively passes through the radial opening to engage with the second annular inner teeth portion of the two ring gears; wherein each of the two second pawl portions has the second abutting end portion and the second teeth portion disposed on two opposite ends thereof; a maximum extension length is defined between the second abutting end portion and the second teeth portion, the maximum extension length is greater than a diameter size of the radial opening.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
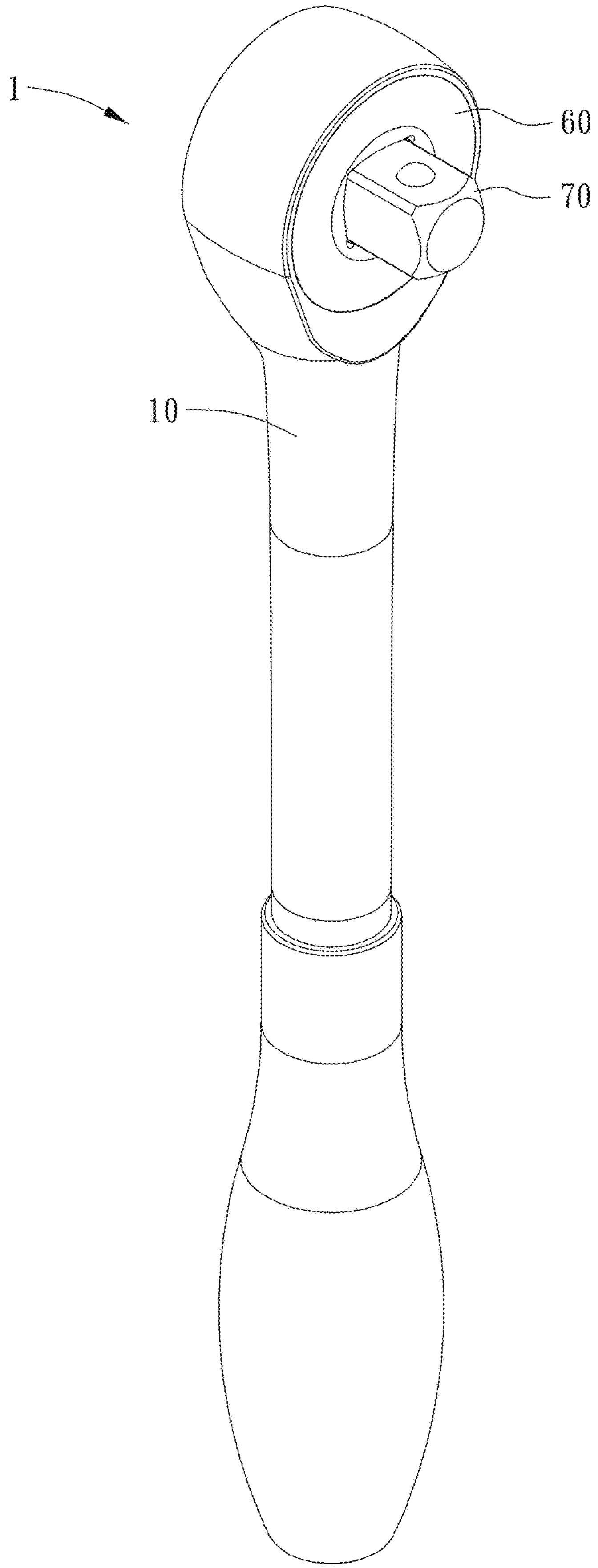
FIG. 1 is a stereogram of a preferable embodiment of the present invention.
Figure 2:
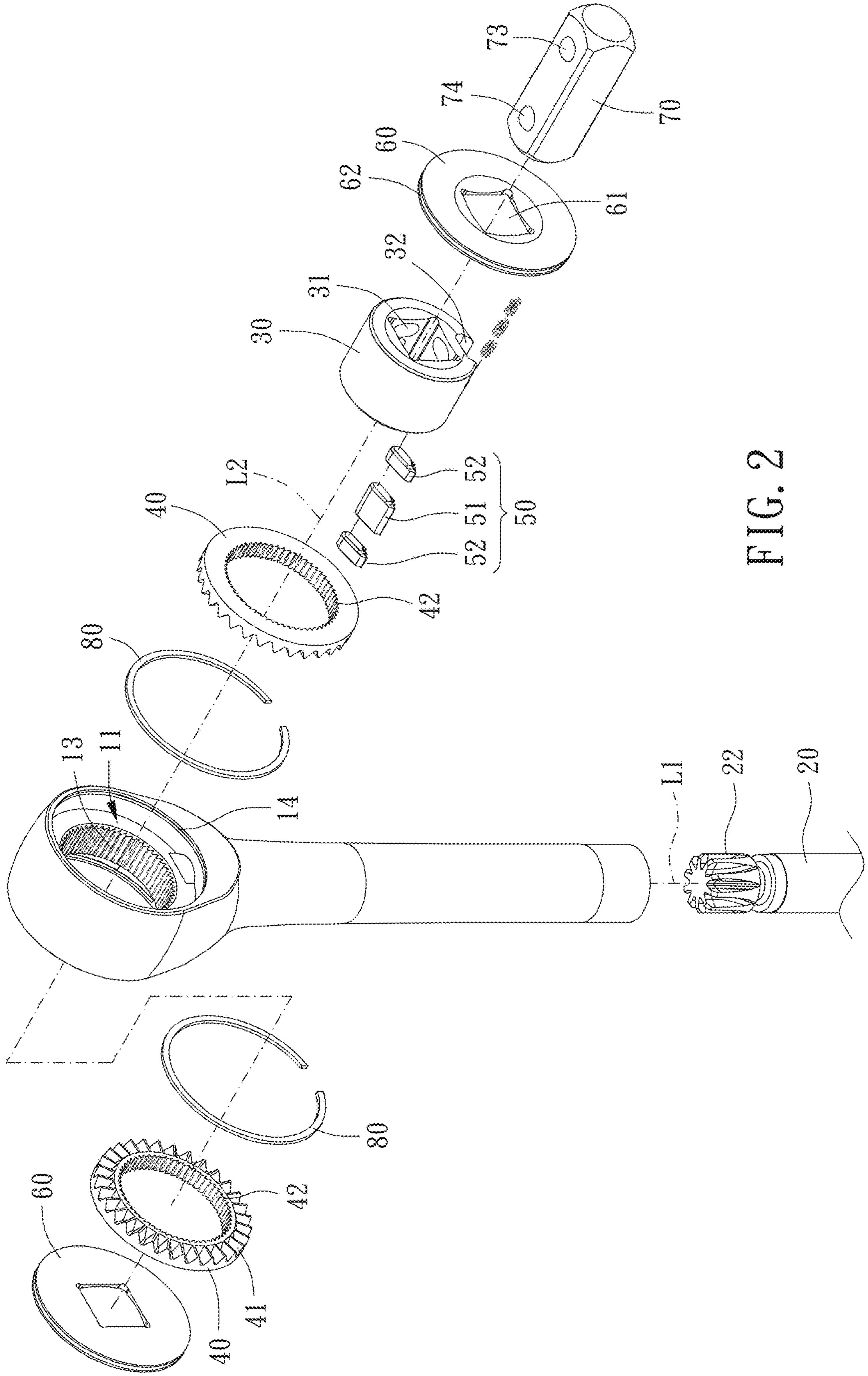
FIG. 2 is a breakdown drawing of a preferable embodiment of the present invention.
Figure 3:
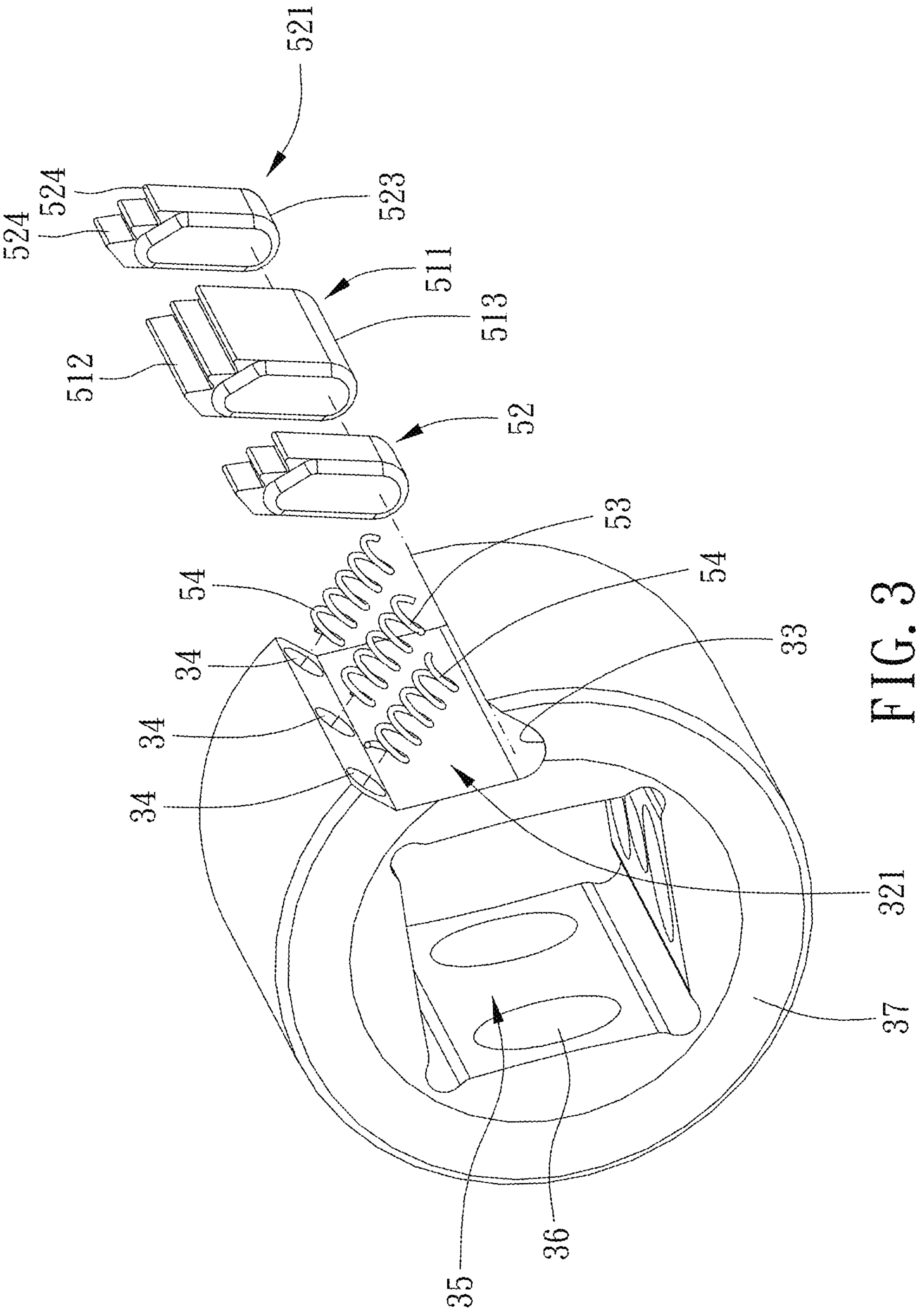
FIG. 3 is a breakdown drawing of a rotation seat and an engagement unit of a preferable embodiment of the present invention.
Figure 4:
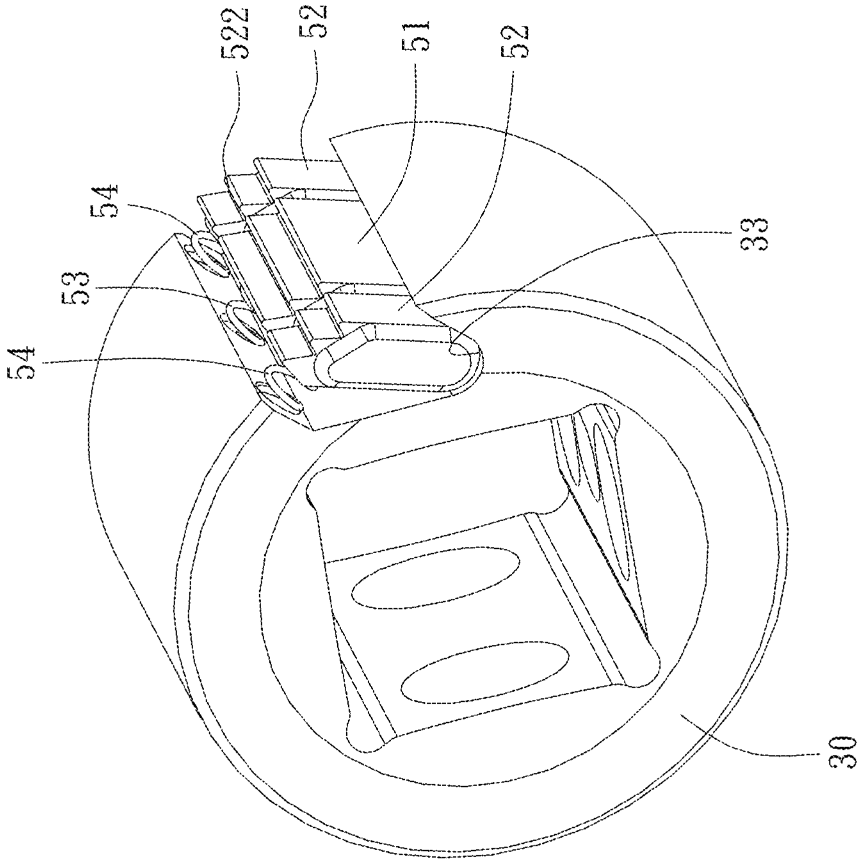
FIG. 4 is a stereogram of a rotation seat and an engagement unit of a preferable embodiment of the present invention.
Figure 5:
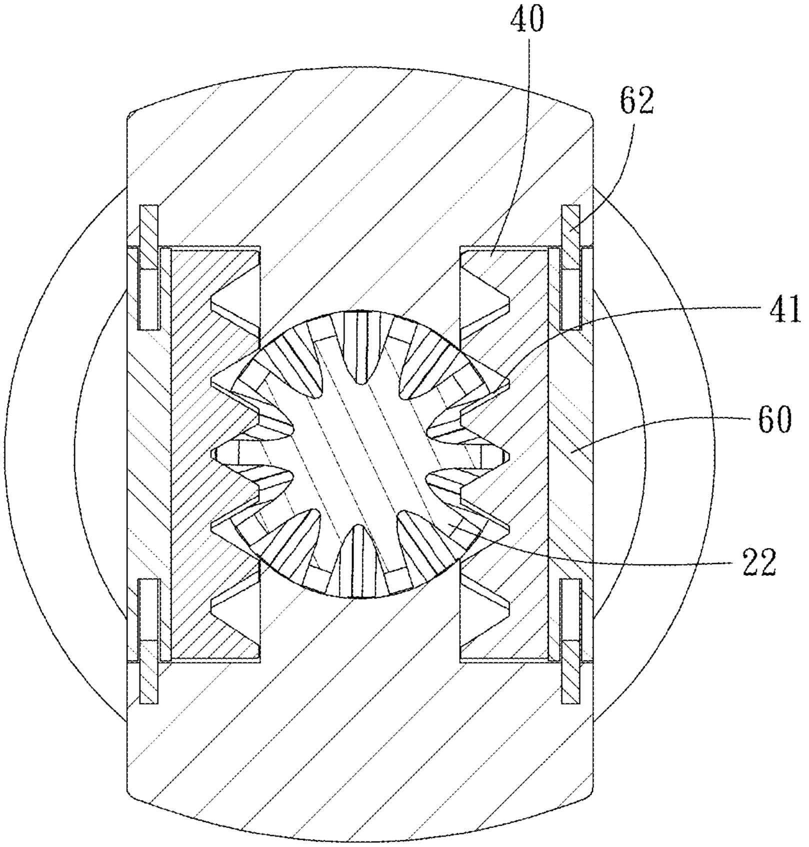
FIG. 5 is a cross-sectional view of a preferable embodiment of the present invention.
Figure 6:
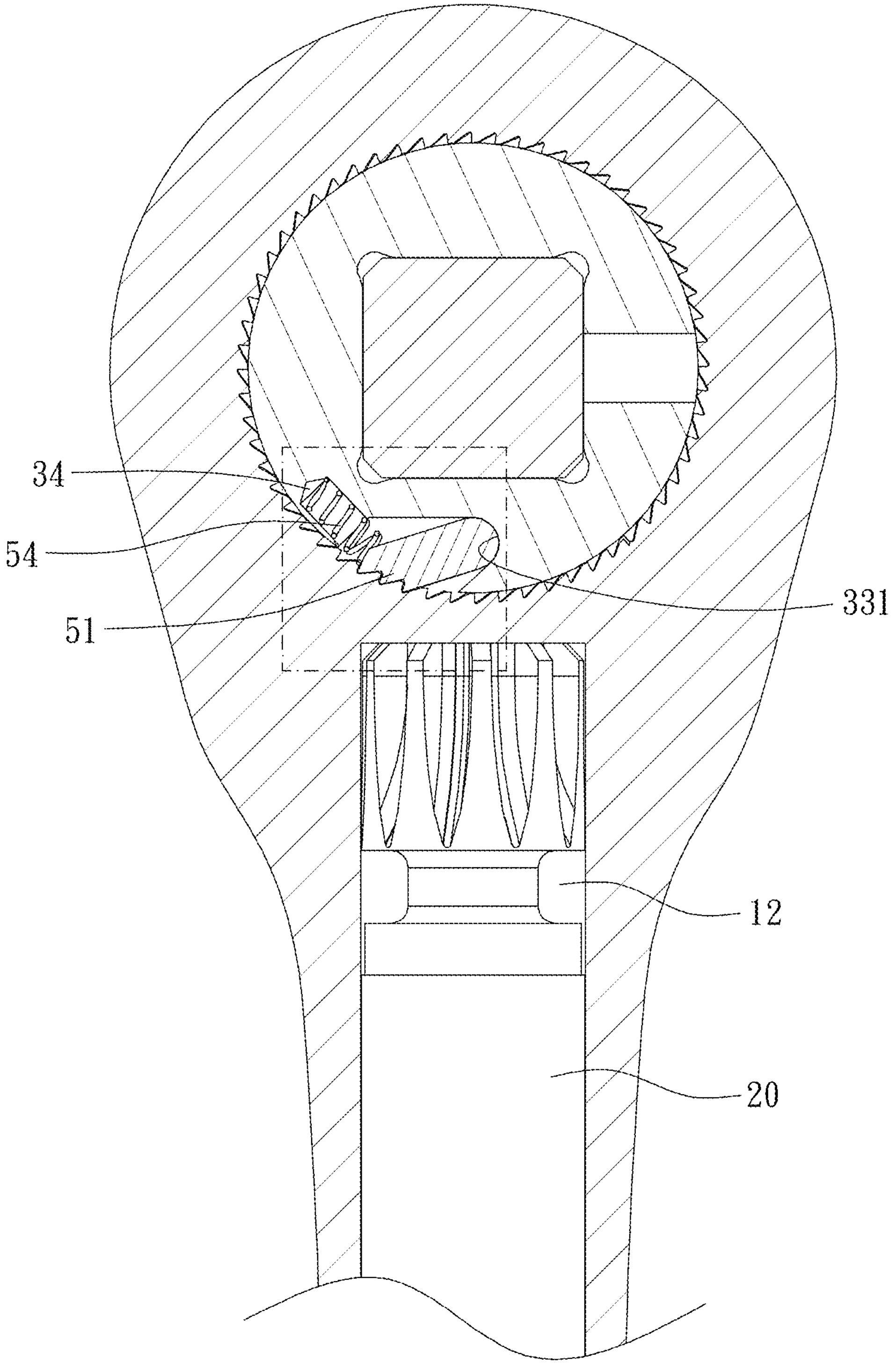
FIG. 6 is another cross-sectional view of a preferable embodiment of the present invention.
Figure 7:
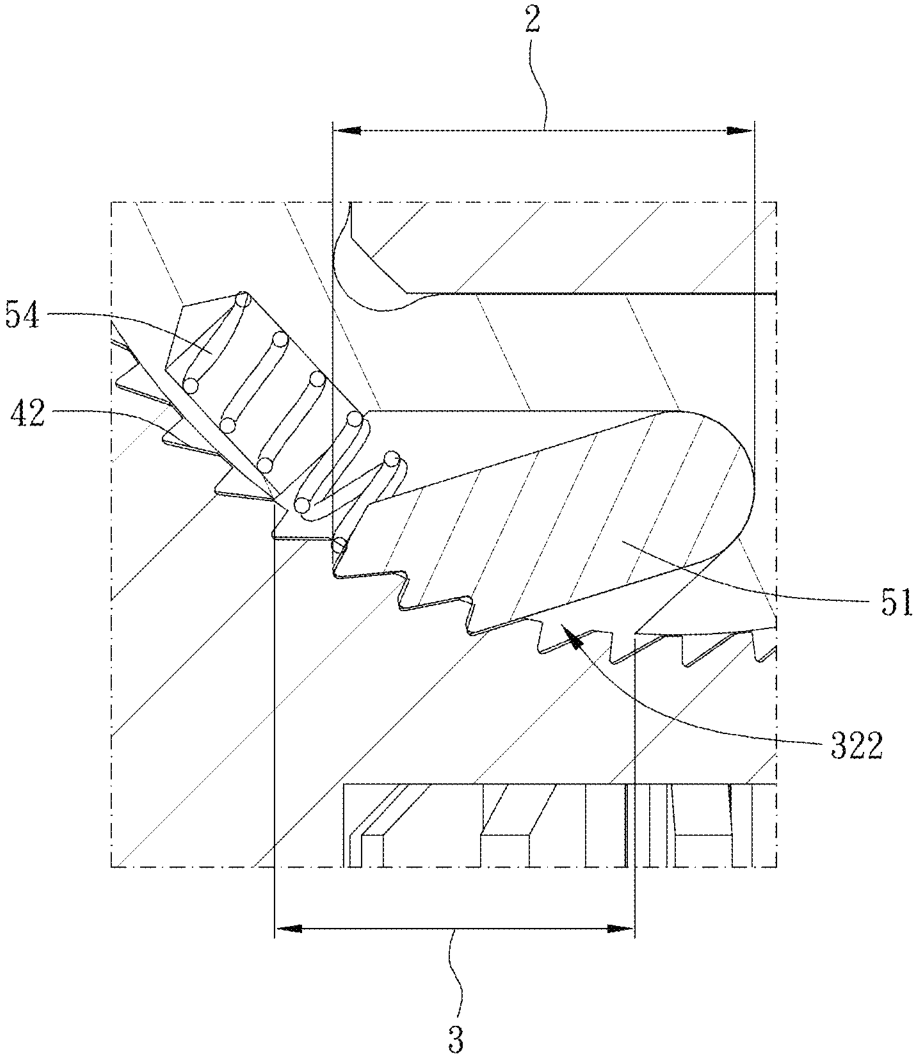
FIG. 7 is an enlarged view of FIG. 6.
Figure 8:
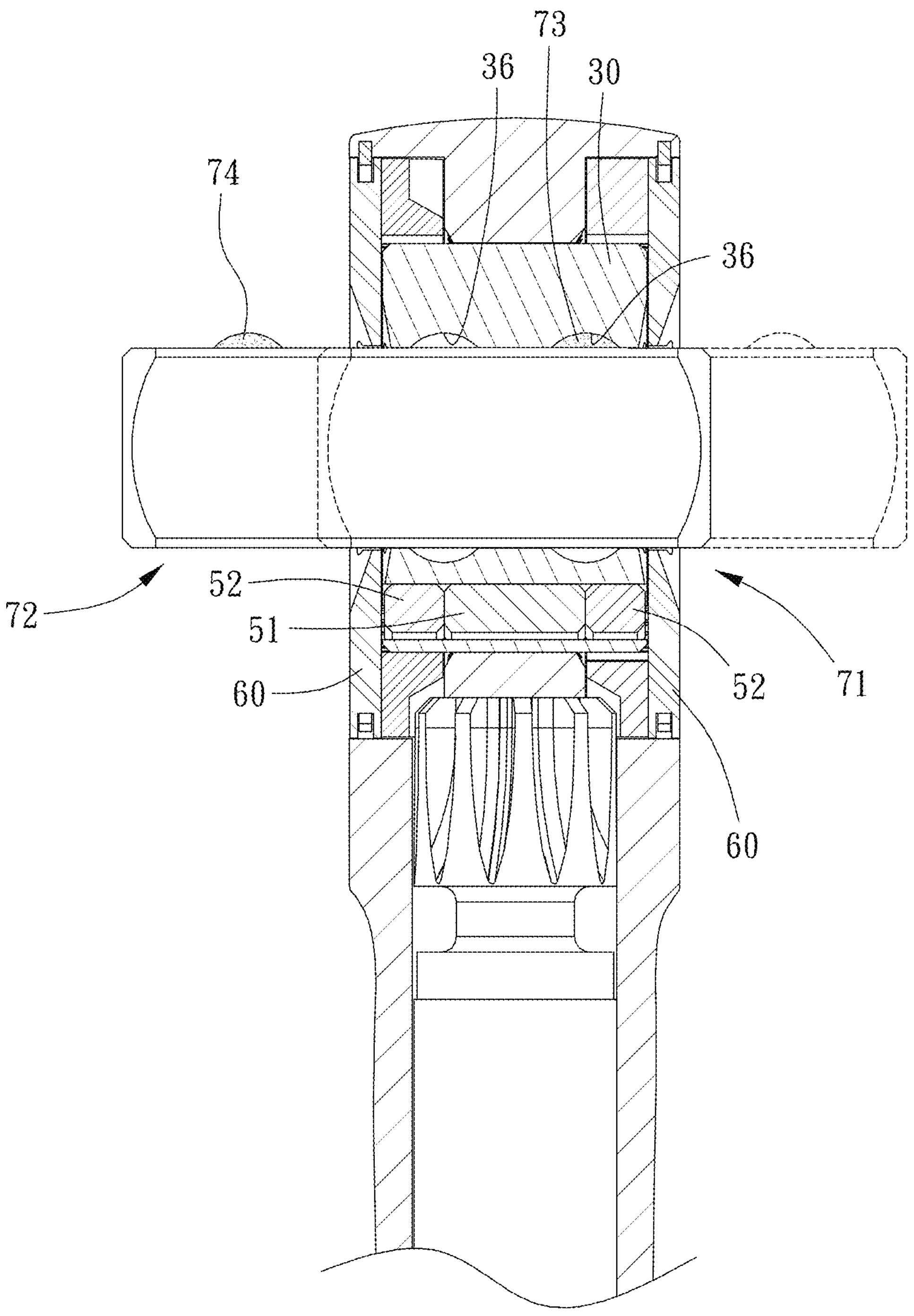
FIG. 8 is a further cross-sectional view of a preferable embodiment of the present invention.

Please refer to FIGS. 1 to 8 for an exemplary embodiment of the present invention. A ratchet wrench 1 of the present invention includes a main body 10, a driving shaft 20, a rotation seat 30, at least one ring gear 40 and an engagement unit 50.

The main body 10 includes a receiving hole 11 and a shaft hole 12, and the receiving hole 11 has a first annular inner teeth portion 13. The driving shaft 20 is disposed through the shaft hole 12, the driving shaft 20 is rotatable about a first axial direction L1, and the driving shaft 20 has a first annular outer teeth portion 22. The rotation seat 30 has a connection portion 31, the rotation seat 30 is received in the receiving hole 11 and is rotatable about a second axial direction L2, and the first axial direction L1 is transverse to the second axial direction L2. The at least one ring gear 40 is rotatably received in the receiving hole 11, and the at least one ring gear 40 has an annular teeth portion 41 and a second annular inner teeth portion 42, the annular teeth portion 41 of the at least one ring gear 40 is engaged with the first annular outer teeth portion 22. The engagement unit 50 is disposed on the rotation seat 30, the engagement unit 50 includes a first pawl portion 51, at least one second pawl portion 52, a first elastic member 53 and at least one second elastic member 54, the first elastic member 53 biases a first teeth portion 512 of the first pawl portion 51 to engage with the first annular inner teeth portion 13, and the at least one second elastic member 54 biases a second teeth portion 522 of the at least one second pawl portion 52 to the second annular inner teeth portion 42 of the at least one ring gear 40; therefore, the ratchet wrench 1 is easy to assemble and can be operated in a tight space.

Specifically, the ratchet wrench 1 includes two said ring gear 40. The rotation seat 30 has a notch 32 formed on an outer circumference thereof, the notch 32 includes an abutting portion 33, the engagement unit 50 is received in the notch 32, the engagement unit 50 further includes two said second pawl portions 52 and two said second elastic members 54, the first pawl portion 51 has a first abutting end portion 511 which abuts against the abutting portion 33 and serving as a first rotation center, the first pawl portion 51 is rotated (pivoted) about the first abutting end portion 511 and moved (pivoted) relative to the rotation seat 30. Each of the two second pawl portions 52 has a second abutting end portion 521 which abuts against the abutting portion 33 and serving as a second rotation center, each of the two second pawl portions 52 is rotated (pivoted) about the second abutting end portion 521 and moved (pivoted) relative to the rotation seat 30. The first elastic member 53 elastically abuts between the rotation seat 30 and the first pawl portion 51, each of the two second elastic members 54 elastically abuts between the rotation seat 30 and one of the two second pawl portions 52.

The abutting portion 33 has an inner concave arcuate surface 331, and the first abutting end portion 511 has a first convex arcuate surface 513. The second abutting end portion 521 has a second convex arcuate surface 523, the first pawl portion 51 swingably abuts against the inner concave arcuate surface 331 by the first convex arcuate surface 513 of the first pawl portion 51, and each of the two second pawl portion 52 swingably abuts against the inner concave arcuate surface 331 by the second convex arcuate surface 523 of each of the two second pawl portions 331.

The second teeth portion 522 has a plurality of teeth 524 arranged obliquely thereon, which can tightly engage with the second annular inner teeth portion 42.

The abutting portion 33 is formed at a corner of the notch 32.

The rotation seat 30 has a plurality of recesses 34, and each of the plurality of recesses 34 extends obliquely and is communicated with the notch 32. The first elastic member 53 and the two second elastic members 54 are respectively disposed in the plurality of recesses 34. The first elastic member 53 biases the first pawl portion 51 obliquely, and each of the two second elastic members 54 biases one of the two second pawl portions 52 obliquely, allowing for tight engagement and providing high torque.

Therefore, the first pawl portion 51 and the two second pawl portions 52 are assembled to the same notch 32, and the first pawl portion 51 and the two second pawl portions 52 can respectively abut against the abutting portion 33 to stably swing relative to the rotation seat 30 to respectively engage with the first annular inner teeth portion 13 and the second annular inner teeth portion 42 and to allow for smooth tooth skipping. Therefore, the ratchet wrench 1 has the advantages of a simple structure, fewer parts, easy manufacturing, and high efficiency in assembly and disassembly. Besides, the rotation seat 30 only needs to have a single notch 32 to accommodate the first pawl portion 51 and the two second pawl portions 52, providing high structural strength and easy processing.

Two opposite sides of the rotation seat 30 have two side surfaces in the second axial direction L2. The notch 32 is disposed through the rotation seat 30 in the second axial direction L2. The notch 32 has at least one opening 321. The at least one opening 321 is formed on the at least one of the two side surfaces 37 and is communicated with the notch 32, and the first pawl portion 51 and the two second pawl portions 52 respectively pass through the at least one opening 321 in the second axial direction L2.

Preferably, the notch 32 includes a radial opening 322 that is radially open on the rotation seat 30, the radial opening 322 is communicated with the notch 32, the radial opening 322 opens toward the first annular inner teeth portion 13 and the second annular inner teeth portion 42 of the two ring gears 40. The first teeth portion 512 of the first pawl portion 51 passes through the radial opening 322 to engage with the first annular inner teeth portion 13. The second teeth portion 522 of each of the two second pawl portions 52 respectively passes through the radial opening 322 to engage with the second annular inner teeth portion 42 of the two ring gears 40; wherein each of the two second pawl portions 52 has the second abutting end portion 521 and the second teeth portion 522 disposed on two opposite ends thereof. A maximum extension length 2 is defined between the second abutting end portion 521 and the second teeth portion 522, the maximum extension length 2 is greater than a diameter size 3 of radial opening 322.

During installation, the first pawl portion 51 and each of the two second pawl portions 52 are inserted into the notch 32 through the at least one opening 321 in the second axial direction L2; then, the rotation seat 30 is inserted into the receiving hole 11. Specifically, the first pawl portion 51 and each of the two second pawl portions 52 are not easily disengaged from the notch 32 in the radial direction of the rotation seat 30 only by being engaged in the notch 32, which has a simple structure and high installation efficiency, and is easy to install.

The ratchet wrench 1 further includes at least one cover 60, the at least one cover 60 (disassembly) covers the receiving hole 11 and is disposed on at least one side of the rotation seat 30 and at least one side of the at least one ring gear 40. The at least one cover 60 covers the at least one opening 321 in the second axial direction L2. In this embodiment, the notch 32 has two said openings 321, the two openings 321 are respectively formed on the two side surfaces 37 in the second axial direction L2, the ratchet wrench 1 includes two said covers 60, the two covers 60 cover two opposite sides of the receiving hole 11 and the two openings 321. Specifically, the ratchet wrench 1 further includes two locking members 80, each of the two covers 60 has an outer annular groove 62, an inner wall of the receiving hole 11 has two inner annular grooves 14 which are disposed separately thereon, each of the two locking members 80 is engaged between the outer annular groove 62 of one of the two covers 60 and one of the two inner annular grooves 14. The two covers 60 can prevent the first pawl portion 51 and each of the two second pawl portions 52 from disengaging from the notch 32 in the second axial direction L2 in use. Besides, each of the two second pawl portions 52 can be easily observed, maintained and adjusted by removing the covers 60.

Preferably, the at least one cover 60 partially covers the rotation seat 30 in the second axial direction L2, the at least one cover 60 has a through hole 61, the through hole 61 corresponds to the connection portion 31, a diameter size of the through hole 61 is smaller than an outer diameter size of the rotation seat 30. The rotation seat 30 and the ring gear 40 can be restrained within the receiving hole 11 by each of the cover 60.

The ratchet wrench 1 further includes a driving rod 70, the connection portion 31 has a coupling hole 35. The driving rod 70 is disposed through the coupling hole 35 and is movable relative to the coupling hole 35 in the second axial direction L2, an inner circumferential wall of the coupling hole 35 has a plurality of engagement recesses 36, and the plurality of engagement recesses 36 are arranged in the second axial direction L2. The driving rod 70 includes a first end portion 71 and a second end portion 72, the first end portion 71 has a first engagement member 73, the second end portion 72 has a second engagement member 74. The first engagement member 73 and the second engagement member 74 are respectively releasably engaged with the plurality of the engagement recesses 36; wherein when the first engagement member 73 is engaged with one of the plurality of engagement recesses 36, the second end portion 72 protrudes from the coupling hole 35 and the second engagement member 74 is exposed outside of the coupling hole 35. Conversely, in this embodiment, each of the plurality of engagement recesses 36 is an arc-shaped groove, the first engagement member 73 and the second engagement member 74 are respectively a positioning ball. The driving rod 70 passes through the through hole 61. The first end portion 71 and the second end portion 72 can be engaged with a fastening tool (such as a bolt or a socket), and the fastening tool can be locked by the first engagement member 73 or the second engagement member 74. The driving rod 70 can be slid to selectively protrude either the first end portion 71 or the second end portion 72 out of the coupling hole 35.

The user can rotate the driving shaft 20 to drive the two ring gears 40 to rotate in opposite directions, causing one of the two second pawl portions 52 to engage with the second annular inner teeth portion 42 of one of the two ring gears 40, thereby driving the rotation seat 30 to rotate. Meanwhile, the other of the two second pawl portions 52 skips the teeth of the second annular inner teeth portion 42 of the other of the two ring gears 40, allowing operation with low torque output or at a small angle in the tight space. It can also achieve high torque output by pressing down one of the handle of the main body 10 to engage the first pawl portion 51 with the first annular inner teeth portion 13.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A ratchet wrench including:

a main body, including a receiving hole and a shaft hole, the receiving hole having a first annular inner teeth portion;

a driving shaft, disposed through the shaft hole, being rotatable about a first axial direction, having a first annular outer teeth portion;

a rotation seat, having a connection portion, received in the receiving hole and being rotatable about a second axial direction, the first axial direction being transverse to the second axial direction;

at least one ring gear, the at least one ring gear rotatably received in the receiving hole, the at least one ring gear having an annular teeth portion and a second annular inner teeth portion, the annular teeth portion of the at least one ring gear engaged with the first annular outer teeth portion; and an engagement unit, disposed on the rotation seat, including a first pawl portion, at least one second pawl portion, a first elastic member and at least one second elastic member, the first elastic member biasing a first teeth portion of the first pawl portion to engage with the first annular inner teeth portion, the at least one second elastic member biasing a second teeth portion of the at least one second pawl portion to engage with the second annular inner teeth portion of the at least one ring gear;

wherein the ratchet wrench includes two said ring gears; the rotation seat has a notch formed on an outer circumference thereof, the notch includes an abutting portion, the engagement unit is received in the notch, the engagement unit includes two said second pawl portions and two said second elastic members, the first pawl portion has a first abutting end portion which abuts against the abutting portion and serving as a first rotation center, the first pawl portion is rotated about the first abutting end portion and moved relative to the rotation seat; each of the two second pawl portions has a second abutting end portion which abuts against the abutting portion and serving as a second rotation center, each of the two second pawl portions is rotated about the second abutting end portion and moved relative to the rotation seat, the first elastic member elastically abuts between the rotation seat and the first pawl portion, each of the two second elastic members elastically abuts between the rotation seat and one of the two second pawl portions;

wherein the notch includes a radial opening that is radially open on the rotation seat, the radial opening is communicated with the notch, the radial opening opens toward the first annular inner teeth portion and the second annular inner teeth portion of the two ring gears, the first teeth portion of the first pawl portion passes through the radial opening to engage with the first annular inner teeth portion, the second teeth portion of each of the two second pawl portions respectively passes through the radial opening to engage with the second annular inner teeth portion of the two ring gears; wherein each of the two second pawl portions has the second abutting end portion and the second teeth portion disposed on two opposite ends thereof; a maximum extension length is defined between the second abutting end portion and the second teeth portion, the maximum extension length is greater than a diameter size of the radial opening.

2. The ratchet wrench of claim 1, wherein the abutting portion has an inner concave arcuate surface, the first abutting end portion has a first convex arcuate surface, the second abutting end portion has a second convex arcuate surface, the first pawl portion swingably abuts against the inner concave arcuate surface by the first convex arcuate surface, and each of the two second pawl portions swingably abuts against the inner concave arcuate surface by the second convex arcuate surface of each of the two second pawl portions.

3. The ratchet wrench of claim 2, wherein the abutting portion is formed at a corner of the notch.

4. The ratchet wrench of claim 1, wherein the rotation seat has a plurality of recesses, each of the plurality of recesses extends obliquely and is communicated with the notch, the first elastic member and the two second elastic members are respectively disposed in the plurality of recesses, the first elastic member biases the first pawl portion obliquely, and each of the two second elastic members biases one of the two second pawl portions obliquely.

5. The ratchet wrench of claim 1, wherein two opposite sides of the rotation seat have two side surfaces in the second axial direction, the notch is disposed through the rotation seat in the second axial direction, the notch has at least one opening, the at least one opening is formed on the at least one of the two side surfaces and is communicated with the notch, and the first pawl portion and the two second pawl portions respectively pass through the at least one opening in the second axial direction.

6. The ratchet wrench of claim 5, further including at least one cover, the at least one cover covering the receiving hole and disposed on at least one side of the rotation seat and at least one side of the ring gear, the at least one cover covering the at least one opening in the second axial direction; wherein the at least one cover partially covers the rotation seat in the second axial direction, the at least one cover has a through hole, the through hole corresponds to the connection portion, a diameter size of the through hole is smaller than an outer diameter size of the rotation seat.

7. The ratchet wrench of claim 6, wherein the abutting portion has an inner concave arcuate surface, the first abutting end portion has a first convex arcuate surface, the second abutting end portion has a second convex arcuate surface, the first pawl portion swingably abuts against the inner concave arcuate surface by the first convex arcuate surface of the first pawl portion, and each of the two second pawl portions swingably abuts against the inner concave arcuate surface by the second convex arcuate surface of each of the two second pawl portions; the abutting portion is formed at a corner of the notch; the rotation seat has a plurality of recesses, each of the plurality of recesses extends obliquely and is communicated with the notch, the first elastic member and the two second elastic members are respectively disposed in the plurality of recesses, the first elastic member biases the first pawl portion obliquely, and each of the two second elastic members biases one of the two second pawl portions obliquely; the notch has two said openings, the two openings are respectively formed on the two side surfaces in the second axial direction, the ratchet wrench includes two said covers, the two covers cover two opposite sides of the receiving hole and the two openings; the ratchet wrench further includes two locking members, each of the two covers has an outer annular groove, an inner wall of the receiving hole has two inner annular grooves which are disposed separately thereon, each of the two locking members is engaged between the outer annular groove of one of the two covers and one of the two inner annular grooves; the ratchet wrench further includes a driving rod, the connection portion has a coupling hole, the driving rod is disposed through the coupling hole and is movable relative to the coupling hole in the second axial direction, an inner circumferential wall of the coupling hole has a plurality of engagement recesses, the plurality of engagement recesses are arranged in the second axial direction, the driving rod includes a first end portion and a second end portion, the first end portion has a first engagement member, the second end portion has a second engagement member, and the first engagement member and the second engagement member are respectively releasably engaged with the plurality of the engagement recesses; wherein when the first engagement member is engaged with one of the plurality of engagement recess, the second end portion protrudes from the coupling hole and the second engagement member is exposed outside of the coupling hole; the driving rod passes through the through hole; the second teeth portion has a plurality of teeth arranged obliquely thereon.

8. The ratchet wrench of claim 1, further including a driving rod, the connection portion having a coupling hole, the driving rod disposed through the coupling hole and being movable relative to the coupling hole in the second axial direction, an inner circumferential wall of the coupling hole having a plurality of engagement recesses, the plurality of engagement recesses arranged in the second axial direction, the driving rod including a first end portion and a second end portion, the first end portion having a first engagement member, the second end portion having a second engagement member, and the first engagement member and the second engagement member respectively releasably engaged with the plurality of the engagement recesses; wherein when the first engagement member is engaged with one of the plurality of engagement recess, the second end portion protrudes from the coupling hole and the second engagement member is exposed outside of the coupling hole.

* * * * *